United States Patent Office 3,464,920
Patented Sept. 2, 1969

3,464,920
METHOD OF REMOVING OIL FROM THE SURFACE OF WATER USING OLEOPHILIC, HYDROPHOBIC COMMINUTED ORGANIC MATERIALS
Ewald Pirson, Michael Roth, and Siegfried Nitzsche, Burghausen, Upper Bavaria, Germany, assignors to Wacker-Chemie G.m.b.H., Munich, Germany
No Drawing. Filed July 20, 1967, Ser. No. 654,704
Int. Cl. B01d 15/00
U.S. Cl. 210—29   4 Claims

ABSTRACT OF THE DISCLOSURE

Natural and synthetic oils floating on and contaminating the surface of bodies of water can be removed by absorption on a comminuted organic solid which has been rendered water repellent but remains oil absorptive after treatment with organosilanes.

---

Recent news events have dramatized the need for development of a method for removing large quantities of oils from the surface of water bodies such as lakes, rivers and oceans. In order to absorb mineral, animal and plant oil products contaminating water surfaces, voluminous organic or inorganic materials such as sawdust, cork flour, peat, diatomaceous earth, furnace ash, perlite and vermiculite can be used. These products fail, however, if oil products which are floating on water are to be absorbed because the materials absorb water and sink to the bottom of the water body before significant quantities of oil can be absorbed.

It is also known that granular perlite can be used to absorb oil. The perlite is expanded and treated with a silicone emulsion before use. The expanded perlite has no mechanical strength, however, and loses its physical integrity during transportation and storage. Perlite in its expanded state requires large valences of storage area, hence long-term storage of large volumes of perlite can prove to be expensive and difficult.

It is the object of this invention to prepare an organic material particularly suited for use as an absorbent for oil and oil-like products present as contaminants on the surface of water. Another object is the preparation of comminuted organic materials which are oleophilic and hydrophobic. Other objects and advantages of this invention are detailed in or will be apparent from the following application.

The invention

This invention comprises the use of solid, comminuted organic materials, particularly fine particle materials which have been treated and reacted with organosilanes of the general formula $R_nSiX_{4-n}$ where R is a monovalent hydrocarbon radical of 1–18 carbon atoms, X is a hydrolyzable atom or group, and $n$ is 1, 2 or 3, to absorb mineral, animal or plant oils and greases floating on water.

The organic materials employed herein will not coalesce when in contact with water because of the pretreatment with organosilanes. Thus, these materials will readily absorb the oils and greases on the water surface with greater efficiency than would be experienced if the organic materials coalesced and formed unwieldy and bulky masses. At the same time, the treated organic material will float on the surface of the water and will not absorb the water, hence it can be removed from the water surface and burned after the oil is absorbed. This is of particular advantage in contrast to the proposed use of inorganic materials used as oil absorbents which must be removed and dispersed or disposed of in some manner after the oil has been absorbed. Further, the organic materials treated in accordance with this invention can be compressed to high density for shipment and storage without destroying their structure or reducing their absorbtive characteristics toward oil.

The solid organic materials employed herein should be commercially available in substantial quantities and at low cost. Materials such as cork chips, wood chips, peat, extracted coffee grounds, saw dust, coal dust and powder and similar organic materials are particularly useful. These materials are finely divided or comminuted and are employed in the form of powders, granulates, kernels or small spheres in solid form consisting predominantly of product particles not exceeding 5 mm. and preferably below 2.5 mm. in particle size. Organic materials in fiber form can be used where the fibers have lengths in the range from 5μ to 2 cm., preferably 0.25 mm. to 2 mm.

The solid organic materials are treated by contacting them with one or more organosilanes of the general formula $R_nSiX_{4-n}$ where R is a monovalent hydrocarbon radical of 1–18 carbon atoms, preferably 1–6 carbon atoms, and each X is a hydrolyzable atom or group such as halogen atoms, alkoxy radicals of 1–9 carbon atoms and acyloxy radicals of 1–9 carbon atoms. The radicals represented by R can be alkyl, aryl, aralkyl, alkaryl, alkenyl and cycloaliphatic radicals as defined and illustrated in the art and particularly in handbooks such as the, "Handbook of Chemistry and Physics," published annually by the Chemical Rubber Publishing Company. Particularly useful are silanes wherein R is an alkyl radical of 1–6 carbon atoms or an aryl radical and methyl and phenyl radicals are particularly useful. The silanes have 1, 2 or 3 of the organic radicals per silicon atom. The hydrolyzable groups can be halogen atoms such as F, Cl, Br and I with chlorine being most common and generally preferred. Also useful are lower alkoxy radicals such as methoxy, ethoxy, propoxy and hexoxy as well as acyloxy radicals such as acetoxy and propionoxy (i.e.

where z is 1–8).

It is suggested a useful source of the silanes employed as treating agents herein is the by-produced silane mixture obtained from the reaction of methyl chloride with silicon in the well-known direct process for producing methyl chlorosilanes. These materials are well known and are inexpensive. They are characterized as DPR and are described in detail in the art, (see, for example, U.S. Patent No. 2,706,724, especially column 2).

The organic material can be brought into contact with the organosilane in any desired manner. One excellent method is to pass the organosilane through a fluidized bed of the organic material. Countercurrents of organic material and organosilane can also be employed to effect the desired contact. The result, in any case, will be to alter the surface chemistry of the organic materials by bonding organosiloxy groups thereto (i.e. $R_nSiO_{4-n/2}$, organic material).

The organosilane can be applied alone or in combination with catalysts which can be introduced separately or in mixture with the organosilanes. Metal halides such as aluminum chloride, titanium chlorides, tin chlorides, zirconium cholrides and organotin compounds such as dibutyltindilaurate can be employed as catalysts in amounts in the range from 1 to 30 percent by weight based on the weight calculated on the weight of the silane employed. A suggested list of operable metal catalysts can be found in U.S. Patent No. 3,127,363. Materials which lend a mineral character to the product such as water-glass, alkylsilicates and alkylpolysilicates can also be added in amounts from 1 to 50 percent by weight calculated on the weight of the organic material, together with the organosilane and catalysts.

The solid organic materials are impregnated with 0.25 to 5.0 percent by weight of organosilanes based on the weight of the organic material. When less than 0.25 percent organosilane is percent, the desired degree of hydrophobicity is not achieved and it is uneconomical to use more than 5 percent of the organosilane on the stated basis because no further improvement in product is realized. Generally, 1–2 percent by weight of organosilane is sufficient to achieved the desired results. Heat treatment of the organic material can be carried out during or after contacting the organic material with the organosilane. It is also suggested the organic materials can be treated with bases such as ammonia after treatment to neutralize any by-produced acid retained therein.

The structure of the solid organic material is not altered by the treatment with organosilanes. It can be brought to high density by compression. Compressing the material to high density will increase the oil absorption per volume unit. The organic materials will burn, hence after the organic material is saturated with oil it can be removed from the water surface by any desired means, and it can then be disposed of by burning it.

The removal of heating oil, crude oils, etc. from water surfaces, as recently dramatized by the destruction of an oil laden ship off the coast of Great Britain, is indeed an increasing problem. The surface of stagnant or flowing water may be fouled with oils which seriously affect the ecology of the area and the oil can be removed by floating the hydrophobic, oleophilic organic material on the water surface. Because of its hydrophobic characteristics the organic material will float and will not absorb the water with which it comes into contact. Because of its oleophilic characteristics, the organic material readily and preferentially absorbs the oil. The oil saturated organic material does not sink in the water to merely transfer the area of pollution from the surface to the bottom area of the water, but it is removed by simple means which are readily apparent and is burned, thus solving the problem once and for all.

The following examples are included herein to assist those skilled in the art to better understand and practice this invention.

Example 1

Sawdust with a particle size in the range from 0.5 to 1.5 mm. was treated in a fluidized bed with 2 percent by weight methyltrichlorosilane calculated on the weight of the sawdust.

The impregnated sawdust was sprinkled on water which had been polluted with diesel oil. The sawdust was not moistened by the water and soaked up the diesel oil. The sawdust floated on the water and, together with the absorbed diesel oil, could easily be burned after it was collected.

For comparison, the same experiment was carried out with untreated sawdust. The sawdust was rapidly moistened by the water and sank within a few minutes.

Example 2

Equivalent results were achieved when Example 1 was repeated employing cork chips, peat, wood chips, extracted coffee grounds, coal dust, and cotton linters in place of the sawdust.

Example 3

Equivalent results were achieved when Example 1 was repeated employing phenyltrichlorosilane, dimethyldichlorosilane, trimethylchlorosilane, methyltriacetoxysilane, methyltrimethoxysilane, methyldichloromethoxysilane and mixtures of the foregoing such as a 50–50 weight mixture of methyltrichlorosilane and dimethyldichlorosilane as well as direct process residue in place of the methyltrichlorosilane.

That which is claimed is:

1. A method of removing synthetic or natural oil from the surface of water comprising (A) adding thereto a comminuted organic material which has been rendered hydrophobic and oleophilic by treatment with an organosilane of the formula $R_nSiX_{4-n}$ where each R is a monovalent hydrocarbon radical of 1–18 carbon atoms, each X is a halogen atom, alkoxy radical of 1–9 carbon atoms or acyloxy radical of 1–9 carbon atoms, and $n$ is 1, 2 or 3, whereby the organic material carries 0.25 to 5.0 percent by weight based on the weight of organic material of organosilane in the form of organosiloxy groups bonded to the surface thereof, (B) maintaining the organic material in contact with the oil until the organic material is substantially saturated with the oil, and (C) removing the organic material from the water surface and burning it.

2. The method of claim 1 wherein the finely divided material employed is sawdust.

3. The method of claim 1 wherein the organosilane employed is a direct process residue.

4. The method of claim 1 wherein the organosilane employed is a methylchlorosilane.

References Cited

UNITED STATES PATENTS

| | | | |
|---|---|---|---|
| 2,367,384 | 1/1945 | Tymstra et al. | 210—36 |
| 2,788,280 | 4/1957 | Rust et al. | |
| 3,382,170 | 5/1968 | Pape | 210—36 |

MICHAEL E. ROGERS, Primary Examiner

U.S. Cl. X.R.

210—36, 40, 502